US011134219B2

(12) United States Patent
Segel

(10) Patent No.: US 11,134,219 B2
(45) Date of Patent: *Sep. 28, 2021

(54) METHOD AND APPARATUS FOR DISTRIBUTING CONTENT

(71) Applicant: Alcatel Lucent, Boulogne-Billancourt (FR)

(72) Inventor: Jonathan Segel, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 70 days.

This patent is subject to a terminal disclaimer.

(21) Appl. No.: 16/775,810

(22) Filed: Jan. 29, 2020

(65) Prior Publication Data

US 2020/0169697 A1    May 28, 2020

Related U.S. Application Data

(63) Continuation of application No. 16/218,725, filed on Dec. 13, 2018, now Pat. No. 10,560,663, which is a
(Continued)

(51) Int. Cl.
*H04N 7/173* (2011.01)
*H04N 21/24* (2011.01)
(Continued)

(52) U.S. Cl.
CPC ......... *H04N 7/17309* (2013.01); *H04N 21/24* (2013.01); *H04N 21/25891* (2013.01);
(Continued)

(58) Field of Classification Search
CPC ............... H04L 65/4076; H04L 65/602; H04L 65/4084; H04L 45/308; H04L 67/1002;
(Continued)

(56) References Cited

U.S. PATENT DOCUMENTS

| 7,584,214 B2 | 9/2009 | Narahara et al. |
| 2002/0073086 A1* | 6/2002 | Thompson ............ H04L 41/046 |

(Continued)

FOREIGN PATENT DOCUMENTS

| GB | 2 385 683 A | 8/2003 |
| JP | 2005-051562 A | 2/2005 |

(Continued)

OTHER PUBLICATIONS

May 8, 2012 Office Action in JP Patent Application No. 2010-540213, Alcatel Lucent, Applicant, 3 pages.
(Continued)

*Primary Examiner* — Asad M Nawaz
*Assistant Examiner* — Najeeb Ansari
(74) *Attorney, Agent, or Firm* — Tong, Rea, Bentley & Kim, LLC

(57) ABSTRACT

The invention includes a method and apparatus for delivering content to one or more content destination nodes. A method includes receiving content utility prediction information for a content item, selecting a content distribution mode for the content item using the content utility prediction information, and propagating the content item toward at least one of the content destination nodes using the selected content distribution mode and, optionally, with a defined priority, sequence, or schedule. The content utility prediction information is associated with the content destination nodes, and is indicative of a level of utility of the content item to the content destination nodes. The content distribution mode may include any content distribution mode, such as broadcast, switched broadcast, multicast, unicast, and the like. The content utility prediction information is received from one or more content prediction nodes. The content is distributed to one or more content destination nodes, which may include end user terminals and/or network-based caching nodes.

19 Claims, 7 Drawing Sheets

Related U.S. Application Data continuation of application No. 11/967,365, filed on Dec. 31, 2007, now abandoned.

(51) Int. Cl.
  *H04N 21/258* (2011.01)
  *H04N 21/262* (2011.01)
  *H04N 21/658* (2011.01)
  *H04L 29/08* (2006.01)

(52) U.S. Cl.
  CPC ....... *H04N 21/262* (2013.01); *H04N 21/6582* (2013.01); *H04L 67/1095* (2013.01)

(58) Field of Classification Search
  CPC ............. H04L 67/1095; H04L 41/0896; H04L 41/0893; H04L 67/32; H04L 41/147; H04L 41/5051; H04L 43/0876; H04L 21/2402; H04L 21/2405; H04L 21/23; H04W 4/028; H04W 28/08; H04N 7/17309; H04N 21/24; H04N 21/262; H04N 21/6582; H04N 21/25891
  See application file for complete search history.

(56) References Cited

U.S. PATENT DOCUMENTS

| | | |
|---|---|---|
| 2002/0078174 A1 | 6/2002 | Sim |
| 2002/0083118 A1 | 6/2002 | Sim |
| 2002/0156911 A1* | 10/2002 | Croman ............. H04L 41/5077 709/235 |
| 2003/0002862 A1 | 2/2003 | Rodriguez et al. |
| 2003/0061040 A1 | 3/2003 | Likhachev et al. |
| 2003/0115278 A1 | 6/2003 | Goker |
| 2003/0130887 A1 | 7/2003 | Nathaniel |
| 2003/0227478 A1 | 12/2003 | Chatfield |
| 2005/0010653 A1 | 1/2005 | McCanne |
| 2005/0076104 A1 | 4/2005 | Liskov |
| 2005/0108356 A1 | 5/2005 | Rosu |
| 2005/0120373 A1 | 6/2005 | Thomas et al. |
| 2005/0160458 A1 | 7/2005 | Baumgartner |
| 2006/0010467 A1 | 1/2006 | Segel |
| 2006/0149854 A1 | 7/2006 | Rudkin et al. |
| 2006/0195557 A1 | 8/2006 | Dew et al. |
| 2006/0209694 A1 | 9/2006 | Chandhok et al. |
| 2007/0124769 A1 | 5/2007 | Casey et al. |
| 2007/0130585 A1 | 6/2007 | Perret et al. |
| 2007/0204057 A1 | 8/2007 | Shaver et al. |
| 2007/0234102 A1 | 10/2007 | Fan et al. |
| 2008/0005349 A1 | 1/2008 | Li |
| 2008/0155623 A1 | 6/2008 | Ota |
| 2008/0177861 A1 | 7/2008 | Basani et al. |
| 2008/0273591 A1 | 11/2008 | Brooks et al. |
| 2008/0301736 A1 | 12/2008 | Heilbron et al. |
| 2008/0320516 A1 | 12/2008 | Yee et al. |
| 2009/0049185 A1 | 2/2009 | Hudson |
| 2009/0049471 A1 | 2/2009 | Kamiya |
| 2009/0055506 A1 | 2/2009 | Hudson |
| 2009/0055547 A1 | 2/2009 | Hudson |
| 2009/0106802 A1 | 4/2009 | Zuckerman et al. |
| 2009/0119715 A1 | 5/2009 | Schwesinger et al. |
| 2009/0133079 A1 | 5/2009 | Li et al. |
| 2009/0157899 A1 | 6/2009 | Gagliardi |
| 2009/0210549 A1 | 8/2009 | Hudson |
| 2010/0250674 A1 | 9/2010 | Terao et al. |

FOREIGN PATENT DOCUMENTS

| | | |
|---|---|---|
| JP | 2007-324897 A | 12/2007 |
| WO | WO 2002/023363 A | 3/2002 |
| WO | WO 2007/068290 A | 6/2007 |

OTHER PUBLICATIONS

Translation of Chinese Office Action in Chinese Patent Application No. 200880123239.0, dispatched Aug. 28, 2013.
Translation of Chinese Office Action in Chinese Patent Application No. 200880123239.0, dated Mar. 13, 2014, pp. 1-4.
Sep. 24, 2014 Office Action in CN Patent Application No. 200880123239.0, Alcatel Lucent, Applicant, 4 pages.
EPO Brief Communication EP Form 2906, dated Jan. 5, 2018, in corresponding EP Application No. 08 869 357.7, 5 pages.
International Search Report and Written Opinion, dated Jul. 16, 2009 in corresponding PCT Application No. PCT/IB2008/055689, Alcatel Lucent applicant, 13 pages.

* cited by examiner

300<sub>A</sub>

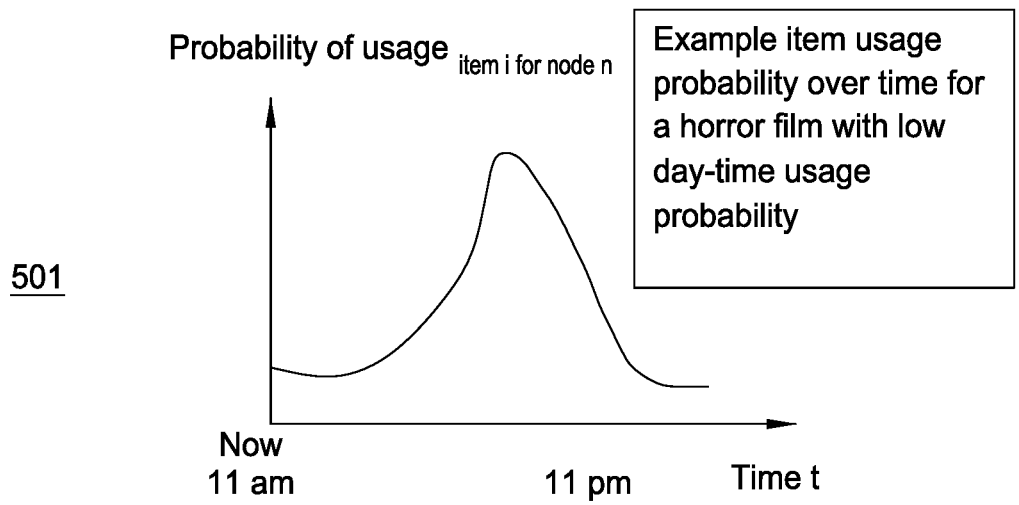
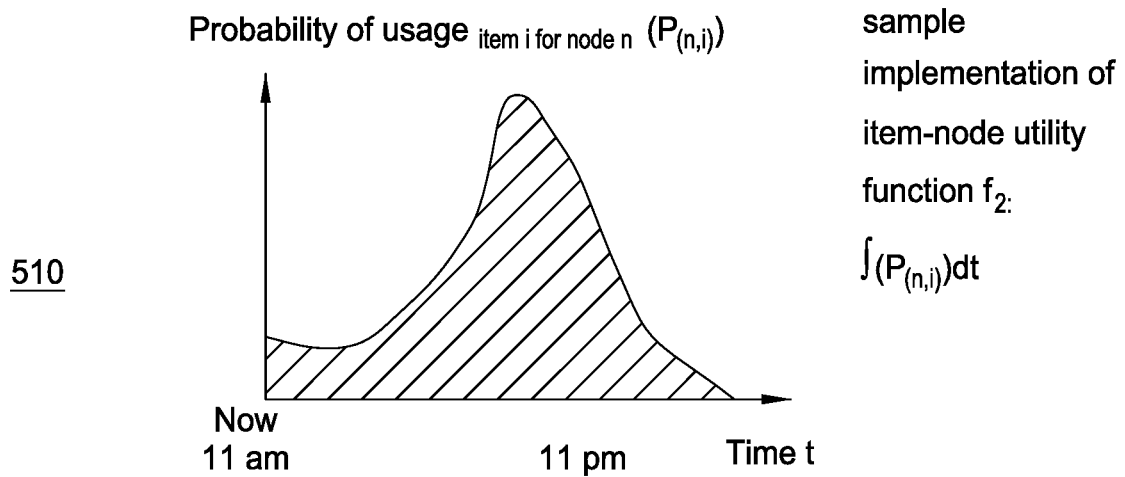
FIG. 5A

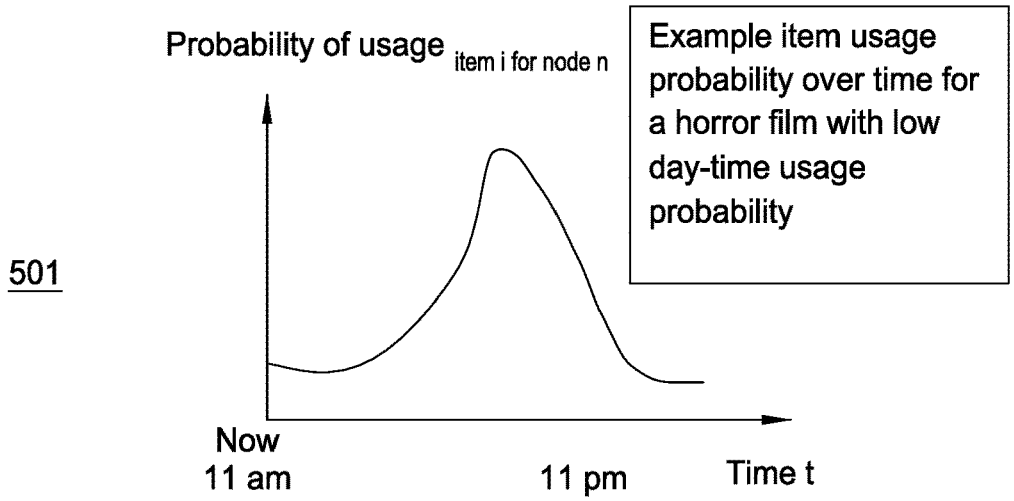
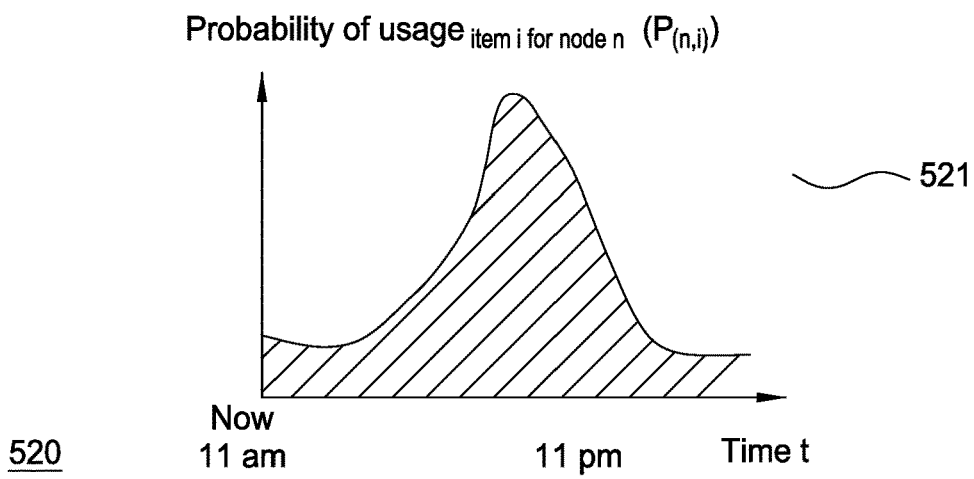
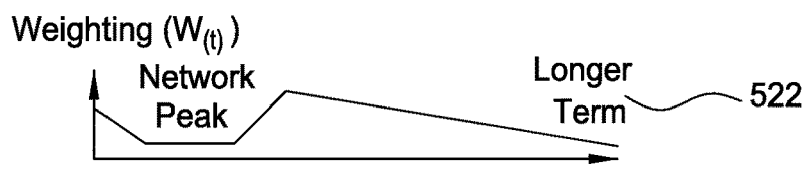
FIG. 5B

METHOD AND APPARATUS FOR DISTRIBUTING CONTENT

CROSS-REFERENCE TO RELATED APPLICATIONS

This application is a continuation of U.S. patent application Ser. No. 16/218,725, filed on Dec. 13, 2018 and entitled METHOD AND APPARATUS FOR DISTRIBUTING CONTENT, which application is a continuation of U.S. patent application Ser. No. 11/967,365, filed on Dec. 31, 2007 and entitled METHOD AND APPARATUS FOR DISTRIBUTING CONTENT, each of which is hereby incorporated herein by reference.

FIELD OF THE INVENTION

The invention relates to the field of communication networks and, more specifically, to content distribution.

BACKGROUND OF THE INVENTION

User satisfaction is maximized when the user is able to access any content at any time. Disadvantageously, however, this can result in an extremely inefficient network if the means or distributing the content is not optimized. Furthermore, as the volume of content that is consumed in a personalized fashion continues to grow, existing mechanisms for delivering content are not always able to efficiently deliver the personalized content to users.

SUMMARY OF THE INVENTION

Various deficiencies in the prior art are addressed through the present invention of a method and apparatus for delivering content to one or more content destination nodes.

A first method includes receiving content utility prediction information for a content item, selecting a content distribution mode for the content item using the content utility prediction information, and propagating the content item toward at least one of the content destination nodes using the selected content distribution mode. The content utility prediction information is associated with the content destination nodes, and is indicative of a level of utility of the content item to the content destination nodes. The content distribution mode may include any content distribution mode, such as broadcast, switched broadcast, multicast, unicast, and the like. The content utility prediction information is received from one or more content prediction nodes. The content is distributed to one or more content destination nodes, which may include end user terminals and/or network-based caching nodes.

A second method includes receiving, from a plurality of content prediction nodes, content utility prediction information for each of a plurality of content items selecting, for each of the content items, a content distribution mode for the content item using the content utility prediction information associated with the content item, and propagating each of the content items toward at least one content destination node using the respective content distribution modes selected for the content items. An embodiment may further include selecting, for each of the content items, a propagation time at which the content item is propagated using the selected content distribution mode. The selection of the respective propagation times for the content items may include at least one of prioritizing the content items with respect to each other, sequencing the content items with respect to each other, and scheduling the content items with respect to available time/capacity slots.

BRIEF DESCRIPTION OF THE DRAWINGS

The teachings of the present invention can be readily understood by considering the following detailed description in conjunction with the accompanying drawings, in which:

FIG. 5A and FIG. 5B depict exemplary graphs showing probability of usage for a content item as a function of time and sample implementation of an item-node utility function for computing utility.

To facilitate understanding, identical reference numerals have been used, where possible, to designate identical elements that are common to the figures.

DETAILED DESCRIPTION OF THE INVENTION

The present invention enhances efficiency of content delivery within the context of increasingly personalized content delivery. The present invention delivers content items from content sources to content destination nodes. The present invention selects a mode of delivery for a content item based on predictive information indicative of a probability of utility of the content item (e.g., that the content item is, will be, or may be useful) to one or more content destination nodes and a number of content destination nodes which may want the content item. The content item is distributed to one or more content destination nodes using the selected content distribution mode. The content distribution mode may include a broadcast mode, a switched broadcast mode, a multicast mode, a unicast mode, and the like.

Since networks providing content distribution in the distribution modes (e.g., broadcast, multicast, unicast) will have certain capacity constraints, the present invention chooses which content items to distribute, which content destination nodes the content items should be distributed to, when the content items should be distributed, and which distribution mode to use to distribute the content items in a manner tending to optimize usage of the constrained network capacity. The present invention increases the ability of the network to satisfy customer requests for content items during peak demand periods, thereby increasing value to end users through the ability to satisfy an increased number of unique content requests and/or to reduce service provider costs by avoiding the need to augment network capacity to meet demand peaks.

Figure 1:
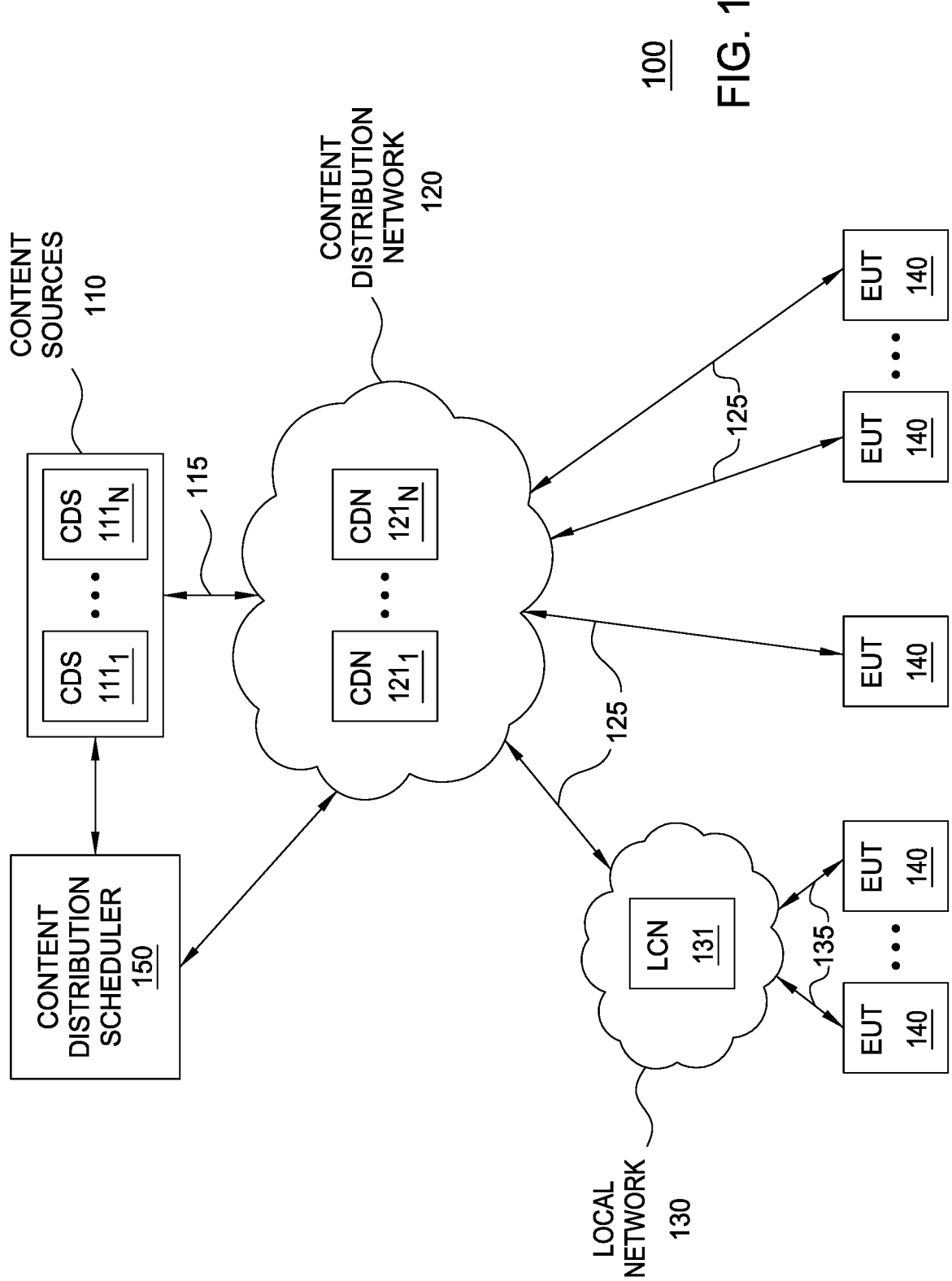
FIG. 1 depicts a high-level block diagram of a communication network architecture.

FIG. 1 depicts a high-level block diagram of a communication network architecture. Specifically, communication network architecture 100 includes a content source (CS)

110, a content distribution network (CDN) 120, and a plurality of end user terminals (EUTs) 140 (collectively, EUTs 140). The CS 110 communicates with CDN 120 using a communication path 115. The CDN 120 communicates with some of the EUTs 140 using communication paths 135. The CDN 120 communicates with others of the EUTs 140 via a local network (LN) 130, where CDN 120 communicates with LN 130 using a communication path 123 and LN 130 communicates with EUTs 140 using communication paths 125. The communication network architecture further includes a content distribution scheduler (CDS) 150, which communicates with CS 110 and CDN 120.

Although primarily depicted and described herein with respect to a communications network architecture that includes specific numbers and configurations of content sources, content distribution networks, and end user terminals, the present invention may be implemented within the context of other communications network architectures including various other numbers and/or configurations of content sources, content distribution networks, and end user terminals. For example, other possible content sources have been omitted from FIG. 1 for purposes of clarity. Thus, the present invention is not intended to be limited by communications network architecture depicted in FIG. 1.

The CDN 120 facilitates distribution of content from CS 110 to EUTs 140 and, optionally, to network elements serving EUTs 140 (e.g., network-based nodes, such as local network caching nodes, access network caching nodes, core network caching nodes, and the like, as well as various combinations thereof). The CDN 120 supports multiple content distribution modes. For example, CDN 120 may support content distribution modes such as a broadcast mode, a switched broadcast mode, a multicast mode, a unicast mode, and the like, as well as various combinations thereof. The CDN 120 includes a plurality of content distribution nodes (CDNs) $121_1$-$121_N$ (collectively, CDNs 121) which facilitate distribution of content from CS 110 to (or at least toward, e.g., in the case of caching nodes) EUTs 140 using the different content distribution modes.

The CDNs 121 may include any network elements for facilitating distribution of content from CS 110 to EUTs 140. The CDNs 121 may vary for different content distribution modes. For example, CDNs 121 may include broadcast nodes supporting content broadcast and/or switched broadcast capabilities (e.g., broadcast replication elements for replicating broadcast content, switches, routers, servers, caching nodes, and like elements), multicast nodes supporting content multicast capabilities (e.g., multicast replication elements for replicating multicast content, switches, routers, servers, caching nodes, and like elements), unicast nodes supporting content unicast capabilities (e.g., routers, switches, caching nodes, and like elements), and the like, as well as various combinations thereof.

The CDN 120 is depicted herein as one communication network (i.e., for purposes of clarity, the specific content distribution networks have not been depicted); however, as described herein, CDN 120 may include one or more of a broadcast network, a switched broadcast network, a multicast network, a unicast network, and the like, as well as various combinations thereof. The broadcast, switched broadcast, multicast, and unicast networks may be implemented as one or more distinct networks. In one embodiment, for example, broadcast or switched broadcast capabilities may be provided by a broadcast network (or broadcast-like network), while multicast and unicast capabilities may be provided by a multicast/unicast network. In another embodiment, for example, broadcast and switched broadcast capabilities may be provided by a broadcast network, multicast capabilities may be provided by a multicast network, and unicast capabilities may be provided by a unicast network.

In other words, different content distribution modes may be supported using different numbers and/or combinations of content distribution networks, as well as different levels of interaction between such networks (e.g., from isolated networks to fully integrated networks).

For example, content broadcast capabilities may be provided by one or more wired broadcast networks (e.g., an HFC-based broadcast network, an IP-based broadcast network, or any other similar wired networks), wireless broadcast networks (e.g., a Digital Terrestrial Television (DTT) network, a Media-Forward Link Only (MediaFLO) wireless network, a Digital Video Broadcasting-Handheld (DVB-H) wireless network, a Digital Multimedia Broadcasting (DMB) wireless network, a Digital Video Broadcasting-Satellite (DVB-S) network, or any other similar wireless networks), and the like, as well as various combinations thereof.

For example, content multicast capabilities and/or unicast capabilities may be provided by one or more of wired multicast/unicast networks (e.g., IP networks and the like), wireless multicast/unicast networks (e.g., a General Packet Radio Service (GPRS) wireless network, a Universal Mobile Telecommunications System (UMTS) wireless network, a Code Division Multiple Access (CDMA) 2000 (CDMA2000)-based Evolution Data Optimized (EvDO) wireless network, and the like), and the like, as well as various combinations thereof.

The content distribution modes may be provided using various other types of communications networks.

The CS 110 includes a plurality of content distribution servers (CDSs) $111_1$-$111_N$ (collectively, CDSs 111). The CDSs 111 may deliver stored content and/or live content to EUTs 140. The CDSs 111 may deliver stored content and/or live content to network-based nodes capable of storing content for eventual distribution to EUTs 140 (e.g., to one or more of CDSs 121, LCN 131, and the like, as well as various combinations thereof). The CDSs 111 may include broadcast servers, switched broadcast servers, multicast servers, unicast servers, and the like, or any other network element(s) capable of distributing content. The CDSs 111 distribute content to EUTs 140, and to network nodes capable of storing the content for distribution to EUTs 140, using CDNs 120. The CDSs 111 may distribute any type of content (e.g., data, audio, video, multimedia, and the like, as well as various combinations thereof).

The EUTs 140 include any end user terminals capable of requesting, receiving, and displaying content. The EUTs 140 include end user interaction interfaces by which users may request content, as well as interact with presented content. The EUTs 140 include one or more presentation interfaces by which received content is presented to the end user. The EUTs 140 may store content items locally and, thus, may also act as a source of content items for other EUTs 140 in a peer-to-peer fashion. If an EUT 140 is able to retrieve a content item from another EUT 140 or from a local caching node (illustratively, LCN 131), this will reduce the need for that EUT 140 to request the content item from one of the CDSs 111. For example, EUTs 140 may include computers, television systems (e.g., the set top box, television, associated remote controls, and the like), wireless phones, personal digital assistants (PDAs), and the like, as well as various combinations thereof.

The EUTs 140 and LCN 131 may be collectively referred to herein as content destination nodes. The EUTs 140 are considered content destination nodes since the content items are ultimately delivered to EUTs 140 for presentation to end users. The LCN 131 (as well as any other network-based nodes capable of caching content within the content distribution network or other local networks, which nodes have been omitted for purposes of clarity) is considered a content destination node since the content items are delivered to LCN 131 to be cached on behalf of some EUTs 140 for later delivery to those EUTs 140. In other words, content destination nodes may include any nodes adapted for receiving content items and presenting and/or caching the received content items.

The CDS 150 is adapted for scheduling delivery of content from CS 110 to content destination nodes (e.g., EUTs 140, and network nodes capable of storing content for distribution to EUTs 140 (i.e., on behalf of EUTs 140)). The CDS 150 receives content utility prediction information from content prediction nodes. The content utility prediction information is associated with EUTs 140 and network nodes acting on behalf of EUTs 140. The CDS 150 determines a content distribution schedule for distribution of the content items from CS 110 (i.e., to EUTs 140 and to network nodes capable of storing content for distribution to EUTs 140). The CDS 150 directs CS 110 to distribute content items according to the content distribution schedule (i.e., using the selected distribution modes and, optionally, associated content item distribution times determined for the content items).

The content distributed from CS 110 to content destination nodes may be any content capable of being delivered over a communication network. The content delivered from CS 110 to content destination nodes may include one or more content items, or one or more portions of one or more content items. In one embodiment, where a content item has been fragmented into multiple segments, content delivered from CS 110 to content destination nodes may include one or more segments of the content item (e.g., only a subset of the total segments of the content item). In such embodiments, the segments of a content item may be retrieved independently from a single location or different locations and reassembled at the content destination node.

For example, a content item may include a portion of a data file, a data file, a group of data files, a webpage, a portion of an audio clip, an audio clip, a collection of audio clips, a portion of a video clip, a video clip, a collection of video clips, a portion of a multimedia clip, a multimedia clip, a collection of multimedia clips, a user generated video, a live television program, a stored television program, a short or long movie, an on-demand movie, and the like, as well as various combinations thereof. In other words, a content item is any content work or segment of a content work for which distribution of the content item may be scheduled. The content items may include any other forms of content.

The content utility prediction information includes information adapted for use in scheduling distribution of content items from content source nodes to content destination nodes. The content utility prediction information for a content item includes a utility value indicative of a probability of the usefulness of the content item and a volume value indicative of a number of the content destination nodes for which the content item may be useful (also referred to herein as a "fan-out"). The content utility prediction information may be received in any format. As described herein, the content utility prediction information may be received from one or more content prediction nodes.

The content prediction nodes include any devices including predictive intelligence capable of determining content utility prediction information and providing the content utility prediction information to a content scheduler (illustratively, CDS 150). In one embodiment, predictive intelligence may be implemented within the network (e.g., on any network element or network elements, such as CSs 111, CDNs 121, LCN 131, and the like, as well as various combinations thereof). In one embodiment, predictive intelligence may be implemented at the end user (i.e., on EUTs 140). In one embodiment, predictive intelligence may be implemented both within the network and at the end user.

The predictive intelligence may determine content utility prediction information based on content utility feedback information associated with content destination nodes.

In one embodiment, each content destination node (n) has associated with it a probability that a content item (i) will be used at a certain time (t), or $P_{(n,i,t)}$. For the content item (i) at time (t), the probabilities $P_{(n,i,t)}$ for multiple content destination nodes (n) of a network segment (N) may be used to compute a utility factor (U) indicative of the value of sending content item (i) to the network segment (N) having multiple content destination nodes. The utility factor U incorporates multiple factors, including the number of content destination nodes having a non-zero probability $P_{(n,i,t)}$. The utility (U) of sending a content item (i) via a content distribution mode (m) to a network segment (N) having multiple content destination nodes (n) at time (t) may be expressed (in its simplest form) as:

$$U_{(m,i,N,t)} = f_1\left(\sum_{n \in N} P_{(n,i,t)}\right)$$

In this expression of utility, $P_{(n,i,t)}$ is the probability that content item (i) will be used by content destination node (n) at time (t), and $f_1$ is a generalized function indicative that the calculation of utility as a function of the aggregated information from many content destination nodes may involve combining the per content destination node information in different ways. In this simple expression, the utility (U) of sending a particular content item (i) is therefore a function of the sum across all relevant content destination nodes of the probabilities that this content item (i) will be useful to those content destination nodes.

In one embodiment, the scope of a network segment (N) is defined in part by the physical topology of the network and in part by the content distribution mode. Broadcast, by definition, reaches all content distribution nodes that are broadcast aware. Switched Broadcast reaches all content distribution nodes that are within a defined switching area (which is typically geographically defined). Multicast reaches all content distribution nodes that are subtended from a multicast replication point. Unicast reaches one content distribution node. Although primarily depicted and described with respect to this definition of the scope of a network segment (N), in other embodiments a network segment may be defined in other ways.

In one embodiment, information is fed back from content destination nodes to decision points in the network to determine which content items should be sent, and with what priority, sequence, or schedule.

In one embodiment, in addition to feeding back information identifying content items which are or may be useful to content destination nodes, feedback information may also include information identifying content items currently available at content destination nodes. In one such embodiment, the calculation of utility (U) may be modified to incorporate a storage factor (S) which represents a probability that a content item (i) will not be available at content distribution node (n) at time (t) from the content destination node itself, from a local caching node, or from a nearby content destination node, and, thus, must be obtained from a content distribution server. The simplest form of this storage factor would be S=0 if the node has the item, and S=1 if it does not. The modified utility (U) may be expressed as:

$$U_{(i,N,t)} = f_1\left(\sum_{n \in N} f_2(P_{(n,i,t)}, S_{(n,i,t)})\right)$$

In this expression of utility, $P_{(n,i,t)}$ is the probability that content item (i) will be used by content destination node (n) at time (t), $S_{(n,i,t)}$ is the storage factor representing a probability that content item (i) will not be available at content distribution node (n) at time (t), $f_1$ is a generalized function indicative that the calculation of utility as a function of the aggregated information from many content destination nodes may involve combining the per content destination node information in different ways, and $f_2$ is a generalized function indicative that there are multiple ways of calculating utility as a function of those factors affecting utility which are specific to a particular content destination node.

The content items currently available at the content destination nodes may be reported by each of the content destination nodes, or determined in any other manner (e.g., based on the history of the content items which were previously sent to that content destination node). The content items which may be useful to the content destination nodes may be determined in any manner (e.g., based on one or more of requests for content items received from content destination nodes, predictions of requests for content items expected to be received from content destination nodes, recommendations of content items, and the like, as well as various combinations thereof).

For example, recommendation agents (which may be located within the network or at the end user) may request content on behalf of an EUT 140 based on a prediction of which content items are likely to be of interest to the end user. For example, such predictions $P_{(n,i,t)}$ may be based on an analysis of various factors, such as past content consumed, direct signaling from the end user regarding which types of content items are of interest, the catalog of possible content items which might be proposed to the end user, a list of content items which will be proposed to the end user, observed patterns of consumption from other users (e.g., end users determined to be similar to this end user), one or more characteristics of the content item (e.g., type of content, quality of content, and like characteristics), end user terminal characteristics (e.g., storage capabilities, screen size, and similar characteristics), and the like, as well as various combinations thereof.

The requests from such recommendation agents may occur without any active involvement from the end user such that a 'request' for a content item may therefore occur without any active involvement of the end user. In general, a request for a content item (i) that is generated by a recommendation agent will have a lower probability $P_{(n,i,t)}$ of being useful than a request for a content item (i) that is directly requested by an end user (e.g., since the content item that is directly requested by the end user will very likely be used by the end user while the content item that is recommended to the end user may not be accepted by the end user).

In one embodiment, the probability that a content item will be useful at a time in the future may be a function of time. For example, a content item may be more likely or less likely to be requested as a function of the time of day, day of week, day of year, time before or since some event, and the like, as well as various combinations thereof. For example, a recently released movie may have a higher probability of being used than a movie not recently released, a horror film may have a higher probability of being used at night, a holiday film might have a higher probability of being used near the corresponding holiday, and so forth.

In such embodiments, a value indicative of the probability that a content item will be useful at a time in the future may be calculated in a number of ways.

In one embodiment, the value indicative of the probability that a particular content item will be useful at a time in the future may be calculated by calculating the area under a graph in which the probability of utility of that content item is graphed as a function of time. An example is depicted and described with respect to FIG. 5A.

FIG. 5A depicts an exemplary graph showing a probability of usage for a content item (i) as a function of time (t) and a sample implementation of the item-node utility function $f_2$ which may be used for computing utility U based on the exemplary probability of usage. As depicted in FIG. 5A, this example is for a horror movie.

As depicted in FIG. 5A, a graph 501 of the probability of usage of content item (i) for a node (n) as a function of time (t) is provided (denoted as $P_{(i,n)}$). As seen in graph 501, since it may be expected that a horror movie is less likely to be watched during the day, the probability of usage of the horror movie slowly decreases from 11 AM until early afternoon, after which the probably of usage begins increasing slowly. The probability of usage peaks around 10 PM, after which it rapidly decreases and remains low through the middle of the night. It should be noted that this is merely one example of a graph for the probability of usage $P_{(i,n)}$.

In one embodiment, as depicted in FIG. 5A, item-node utility function $f_2$ may be implemented by determining the area under graph 501 (depicted as graph 510). In one such embodiment, item-node utility function $f_2=\int(P_{(i,n)})dt$. This function gives the area under the curve of graph 501 (seen as a shaded area in graph 510). It should be noted that this is merely a sample implementation of item-node utility function $f_2$, which may be implemented in various other ways.

In another embodiment, the value indicative of the probability that a content item will be useful at a time in the future may be calculated by applying weighting factors to the probability that the content item will be used, on the basis of time. An example is depicted and described with respect to FIG. 5B.

FIG. 5B depicts an exemplary graph showing a probability of usage for a content item (i) as a function of time (t) and a sample implementation of the item-node utility function $f_2$ which may be used for computing utility U based on the exemplary probability of usage. As depicted in FIG. 5B, this example is for a horror movie.

As depicted in FIG. 5B, a graph 501 of the probability of usage of content item (i) for a node (n) as a function of time (t) is provided (denoted as $P_{(i,n)}$). As seen in graph 501, since it may be expected that a horror movie is less likely to be watched during the day, the probability of usage of the honor movie slowly decreases from 11 AM until early afternoon, after which the probably of usage begins increasing slowly. The probability of usage peaks around 10 PM, after which it rapidly decreases and remains low through the middle of the night. It should be noted that this is merely one example of a graph for the probability of usage $P_{(i,n)}$.

In one embodiment, as depicted in FIG. 5B, item-node utility function $f_2$ may be implemented by determining the area under graph 501 (depicted as graph 521) where areas under the graph at different times are modified by a weighting function $W_{(t)}$ that is applied in determining item-node utility function $f_2$. In one such embodiment, item-node utility function $f_2 = \int (P_{(i,n)} * W_{(t)}) dt$. This function gives a weighted representation of the area under the curve of graph 501 (seen as a shaded area in graph 521). It should be noted that this is merely a sample implementation of item-node utility function $f_2$, which may be implemented in various other ways.

As depicted in FIG. 5B, a graph 522 of the weighting function $W_{(t)}$ as a function of time (t) is provided. As seen in graph 522, in the short term the weighting value of weighting function $W_{(t)}$ decreases during the hours of peak network usage and then increases during the hours of off-peak network usage, and, in the long term the weighting value of weighting function $W_{(t)}$ decreases linearly. It should be noted that this is merely one example of a graph for weighting function $W_{(t)}$.

The weighting function $W_{(t)}$ (e.g., the manner in which the value of the weight varies over time) may be implemented in many different ways, some examples of which follow.

As one example, for times soon in the future, the value may be low because the network will not have time to deliver the content in its entirety. As another example, if there is no period of off-peak network utilization between now and the time at which a content item might be useful, probability of being used prior to the next off-peak period may have a low value because there is no opportunity to remove demand from the network peak load. As another example, probabilities of usage which are distant in the future may be given a lower value because during the intervening period the end user preferences may change, which will modify the probability that a content item will be useful to the end user.

It should be noted that this is merely a sample implementation of item-node utility function $f_2$, which may be implemented in various other ways.

The value indicative of the probability that a content item will be useful at a time in the future may also be calculated in various other ways.

In another embodiment, the value indicative of the probability that a content item will be useful incorporates information about already-cached partial or complete instances of the content item in end user terminals or in the network. For example, it may be assumed that, if a content item is sent to a content distribution node that already has that content item in its entirety, the new instance of the content item has a low (or zero) probability of being used because the existing version will be used. It will not necessarily be zero in all cases, however, because, for example, there might be a large number of end users requesting a content item such that the end users exceed the serving capacity of an intermediate node at which the content item is cached. In this case, sending the same content item in broadcast mode, or to be stored at additional caching points, has utility.

In another embodiment, calculation of utility incorporates information about the marginal value $MV_{(n,i,t)}$ of delivering a content item (i) to a content destination node (n) at time (t), assuming that the content item will be used at that content destination node. For example, content items might be priced individually, and some items might be 'premium' content having a higher price, and therefore a greater marginal value if available at the content distribution node. In one embodiment, prices for the same content item may differ between content distribution nodes (e.g., geographically segmented pricing), as a function of time, and the like, as well as various combinations thereof. Some content items might be significantly larger in size than other content items, and thus, represent an 'opportunity cost' if network capacity is constrained (i.e., in that other less resource-intensive content items could have been delivered instead of the larger content item). In such embodiments, modified utility (U) may be expressed as:

$$U_{(i,N,t)} = f_1\left(\sum_{n \in N} f_2(P_{(n,i,t)}, S_{(n,i,t)}, MV_{(n,i,t)})\right)$$

In this expression of utility, $P_{(n,i,t)}$ is the probability that content item (i) will be used by content destination node (n) at time (t), $S_{(n,i,t)}$ is the storage factor representing a probability that content item (i) will not be already available at content distribution node (n) at time (t), $MV_{(n,i,t)}$ is the marginal value of delivering a content item (i) to a content destination node (n) at time (t), $f_1$ is a generalized function as described hereinabove, and $f_2$ is a generalized function as described hereinabove.

Although primarily depicted and described herein with respect to an embodiment in which one predictive intelligence point provides content utility prediction information to the content distribution scheduler, the content utility prediction information may be provided to the content distribution scheduler from any number of predictive intelligence points. Although primarily depicted and described herein with respect to an embodiment in which the predictive intelligence point is a network node, the predictive intelligence point(s) may be network nodes and/or end user terminals.

The CDS 150 determines the distribution schedule for the content items by selecting, for each content item, a content distribution mode by which the content item will be distributed, and, optionally, a distribution time of the content item. The distribution mode selected for a content item is one of broadcast distribution, switched broadcast distribution, multicast distribution, unicast distribution, and the like. The distribution time selected for a content item is the time at which the content item is propagated from the source of the content item to the content destination node(s) for which the content item is intended.

The distribution schedule (e.g., selection of content distribution modes for respective content items and, optionally, selection of distribution times for the respective content items) may be determined based on various factors.

The selection of the content distribution mode for a content item is based on the content utility prediction information for the content item (e.g., based on the utility value indicative of the number of content destination nodes which are expected to find a content item useful, weighted by a value indicative of the probability that a given content item will be useful for each of the content distribution node). That is, using the embodiment of the utility calculation described hereinabove (where ● represents $P_{(n,i,t)}$ and, optionally, one or both of $S_{(n,i,t)}$ and $MV_{(n,i,t)}$):

$$U_{(m,i,N,t)} = f_1\left(f_2 \sum_{n \in N}(\bullet)\right)$$

In one embodiment, the content distribution mode (m) for delivering content item (i) into network segment (N) may be selected by calculating a utility value $U_{(m,i,N,t)}$ for each available content distribution mode (m). In one such embodiment, the content distribution mode (m) for which the highest utility value $U_{(m,i,N,t)}$ is calculated is selected as the content distribution mode by which that content item (i) is distributed to that network segment (N).

In another embodiment, the content distribution mode (m) for delivering content item (i) into network segment (N) may be selected on the basis of "fan-out", where a fan-out value for delivery of content item (i) to network segment (N) at time (t) is computed as $F-O_{(i,N,t)}$=count of n in N where $U_{(i,N,t)} > U_{THRESHOLD}$. In one embodiment, $U_{THRESHOLD}=0$, such that the count of content destination nodes with a non-zero utility in a network segment N is the fan-out for that content item. In other embodiment, $U_{THRESHOLD} > 0$, such at least some of the content destination nodes with non-zero utility in a network segment N may be omitted from consideration.

In one embodiment, in which utility between content items is identical, the distribution mode (m) is selected based on the computed $F-O_{(i,N,t)}$. In this embodiment, content items having the highest $F-O_{(i,N,t)}$ values are distributed using broadcast, the content items having intermediate $F-O_{(i,N,t)}$ values are distributed using multicast, and the content items having the lowest $F-O_{(i,N,t)}$ values are distributed using unicast.

In another embodiment, in which utility between content items is not constant, the distribution mode (m) is selected based on any combination of utility (U) and fan-out (F-O), and, optionally, may factor-in specifics of the network by which the content items are delivered.

In one such embodiment, for example, all content items having a high fan-out (F-O) satisfying at least some minimum utility threshold are distributed via a broadcast network until a desired amount of available time/capacity slots have been filled for a broadcast distribution window, at which point remaining content items may be assigned to a shared network using a sum of content destination node utility values as a prioritization mechanism (e.g., using multicast mode if the content item is intended for distribution to multiple content destination nodes; using unicast mode if the content item is intended for distribution to only one content destination node, i.e., $U_{(i,N,t)} > U_{THRESHOLD}$).

Although primarily described herein with respect to one embodiment in which a combination of utility (U) and fan-out (F-O) is used for selecting the content distribution mode by which different content items are distributed, a combination of utility (U) and fan-out (F-O) may be used in various other ways for selecting the content distribution mode by which different content items are distributed.

For a given network segment (N) and distribution mode (m), $U_{(i,t)}$ is a measure of the importance of distributing content item (i), which may be used for prioritizing, sequencing, and/or scheduling content items. The selection of distribution order and timing for content items may be performed in a number of ways. The selection of distribution order/times for content items may include prioritizing the content items with respect to each other (e.g., using rank ordering based on respective $U_{(i,t)}$ values). The selection of distribution order/times for content items may include sequencing the content items with respect to each other. The selection of distribution order/times for content items may include scheduling the content items into defined time/capacity slots.

The determination of the content distribution schedule (including the selection of content distribution modes for respective content items and/or selection of the distribution times for the respective content items, as well as any other determinations associated with determining the content distribution schedule) may be performed using other information.

For example, the distribution schedule may be determined based on times at which the content items become available, times until which the content items remain available, end user expectations regarding delivery of the content items (e.g., whether users will expect to receive the content items as soon as they becomes available or will be willing to wait a certain period of time before receiving the content items), end user plans regarding presentation of the content items (e.g., whether the end users are expected to or plan to review the content immediately or at a later time), respective values of the content items, and the like, as well as various combinations thereof.

The distribution schedule may be determined based on network status information associated with the current and/or expected state of the network, such as network capacity constraint information (e.g., network capacity that is available, network capacity expected to be available in the future, and the like), the cost of delivering the content item (e.g., in terms of network resources or some other measure of cost, such as the size of the content item and the associated share of network resources that will be consumed by sending the content item), and the like, as well as various combinations thereof.

The content distribution schedule may be determined based on various other factors.

A local caching node (illustratively, LCN 131) is a special instance of a content destination node. The local caching node is a server in the access or aggregation network that stores content on behalf of a set of end users. The function of the local caching server is to keep content distribution local. One use of a local caching server is to store content for access by one or more end users who have end user terminals with no storage capacity. Another use of a local caching server is to store an instance of a content item and distribute it, when required, to multiple end users, thereby reducing the load on the network between the local caching server and a content distribution server. The probability that a content item at a local caching node will be used is a function of the probability that the content item will be used by one or more of the end users with access to that local caching node.

$$P_{LCN(i,t)} = f_3\left(\sum_{\substack{allEUTs(n) \\ attached\ to\ LCN}} P_{(n,i,t)}\right)$$

In this expression of utility, $P_{(n,i,t)}$ is the probability that content item (i) will be used by content destination node (n) attached to the local caching node (LCN) at time (t), and $f_3$ is a function combining the probabilities of use by one of the end users. In one embodiment, function $f_3$ may be implemented according to the following procedure:

1. Let initial $P_{LCN(i,t)} = P_{(1,i,t)}$ (i.e., probability of content item i at time t for EUT 1);

2. Let updated $P_{LCN(i,t)}$=initial $P_{LCN(i,t)}+P_{(2,i,t)}*(1-$initial $P_{LCN(i,t)})$;

3. Let updated $P_{LCN(i,t)}$=previous $P_{LCN(i,t)}+P_{(2,i,t)}*(1-$initial $P_{LCN(i,t)})$; and 4. Repeat step 3 for all end user terminals which draw content from the local caching node.

As an example, suppose an LCN node has three attached end user terminals that have $P_{(1,i,t)}$ values of 0.6, 0.1, and 0.3 respectively. Using the example of function $f_3$ described above, the $P_{LCN(i,t)}$ for the local caching node LCN may be computed as follows. The initial assessment of $P_{LCN(i,t)}$ is 0.6 based on the first user. The second user adds $0.1*(1-0.6)=0.04$ bringing the $P_{LCN(i,t)}$ up to 0.64. The third user adds $0.3*(1-0.63)=0.108$, bring the $P_{LCN(i,t)}$ up to 0.748. Thus, the final value of $P_{LCN(i,t)}$ for the local caching node LCN is 0.748.

Although primarily described with respect to a specific implementation of function $f_3$, various other algorithms for computing function $f_3$ may also be used. In one embodiment, for example, function $f_3$ may be implemented using recursive Bayesian estimation, which may incorporate other information known at the local caching nodes (e.g., such as the history that a given end user use probability has been reported given that a content item was used). The function $f_3$ may be implemented in various other ways.

The CDS 150 directs distribution of content items to content destination nodes based on the content distribution schedule. The CDS 150 provides the content distribution schedule information to CS 110, for use by CDSs 111 in determining: which content items should be distributed, to which content destination nodes the content items should be distributed, the order in which content items should be distributed (e.g., priority), the content distribution mode(s) by which the content items should be distributed, at which time(s) the content items should be distributed, and the like, as well as various combinations thereof.

The CDS 150 may direct distribution of content items from CS 110 to content destination nodes in any manner. In one embodiment, for example, CDS 150 may provide the content distribution schedule to CS 110 such that each CDS 111 processes the content distribution schedule in order to determine which portion(s) of the content distribution schedule have applicability to that CDS 111. In another embodiment, for example, CDS 150 may process the content distribution schedule in order to direct each of the CDSs 111 to distribute content to the content destination nodes according to the content distribution schedule. The CDS 150 may direct distribution of content items from CS 110 to content destination nodes in any other manner.

Figure 2:
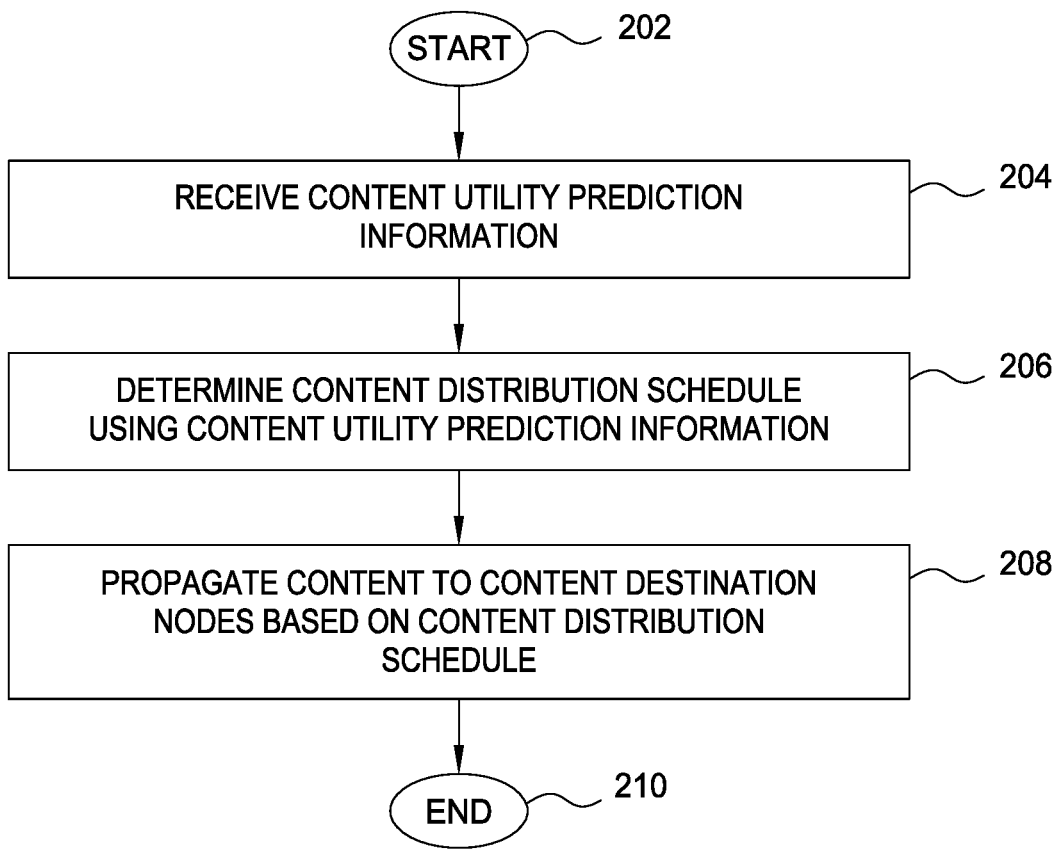
FIG. 2 depicts a method according to one embodiment of the present invention.

The operation of CDS 150 in performing content distribution functions of the present invention may be better understood with respect to the method depicted and described with respect to FIG. 2 and the example depicted and described with respect to FIG. 3.

FIG. 2 depicts a method according to one embodiment of the present invention. Specifically, method 200 of FIG. 2 includes a method for delivering content from content sources to content destination nodes according to a content distribution schedule determined based on content utility prediction information. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, content utility prediction information is received. At step 206, a content distribution schedule is determined. At step 208, content is distributed to content destination nodes based on the content distribution schedule. At step 210, method 200 ends. The operation of method 200 may be better understood when considered in conjunction with the description of FIG. 1. Although depicted and described as ending (for purposes of clarity), it will be understood that method 200 will continue to operate such that distribution of content according to content utility prediction information continues to be performed dynamically.

Figure 3A:
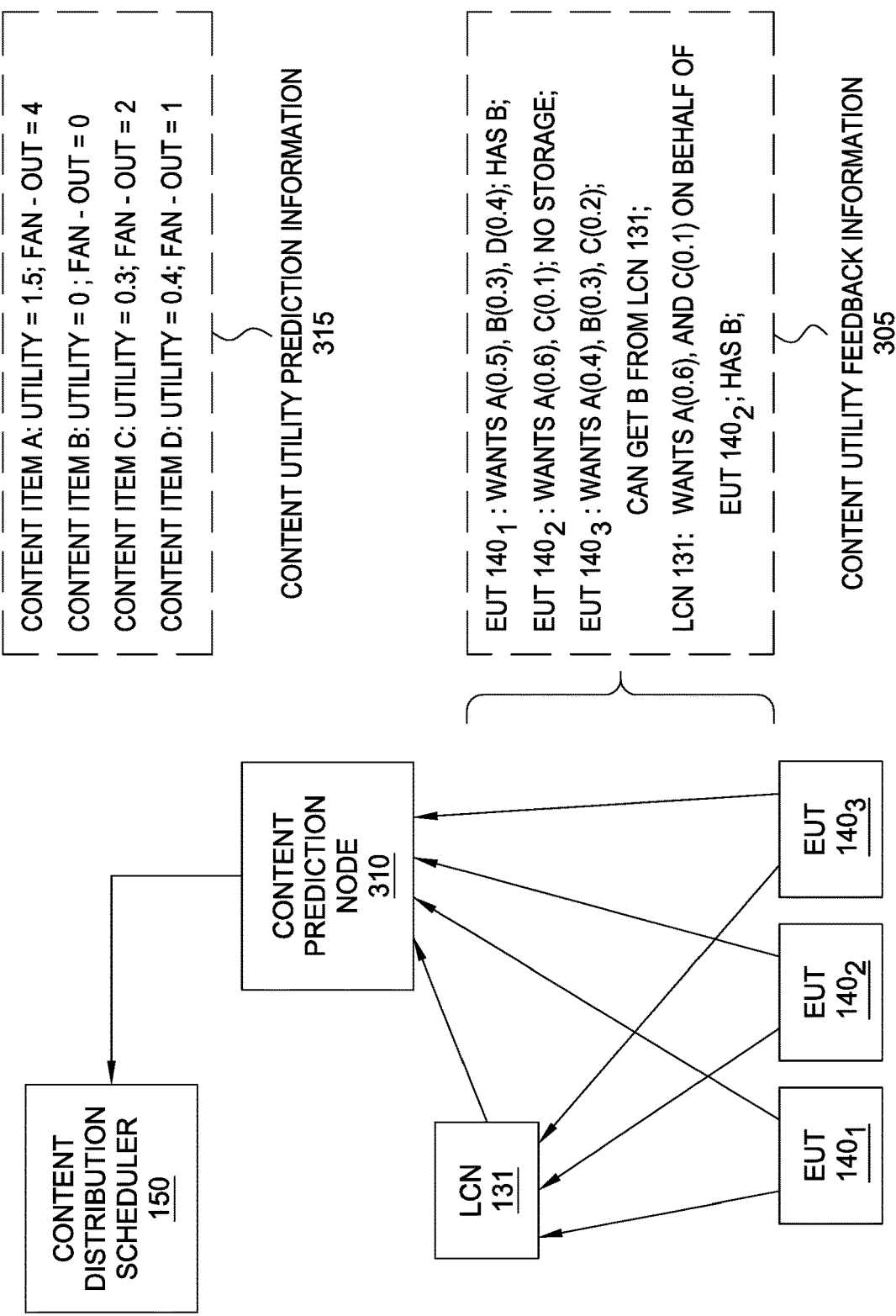
FIG. 3A depicts a high-level block diagram of an example depicting the content distribution functions of the present invention.
Figure 3B:
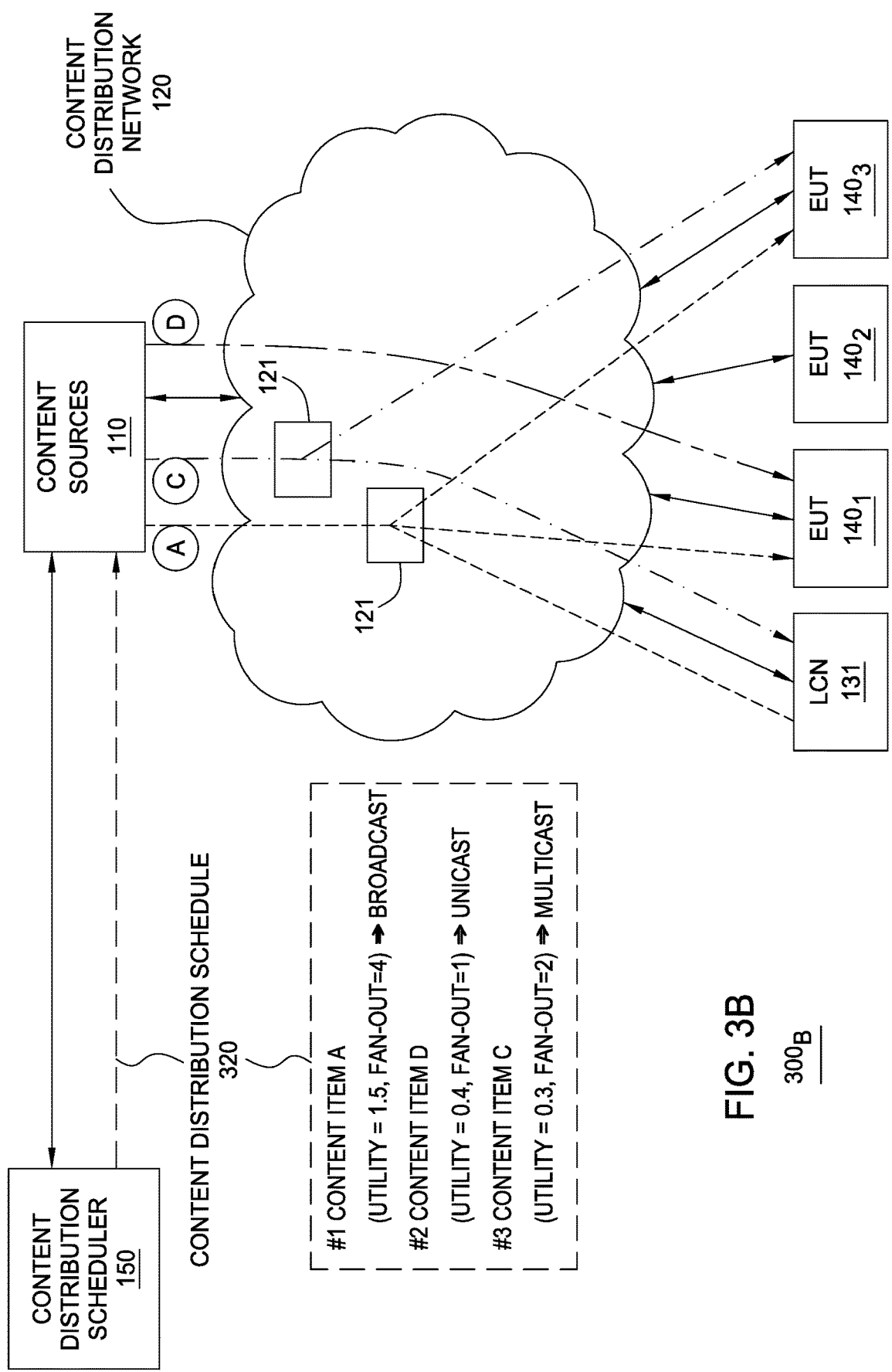
FIG. 3B depicts a high-level block diagram of an example depicting the content distribution functions of the present invention.

The content distribution functions of the present invention may be better understood with respect to an example. FIG. 3 depicts high-level block diagrams of an example illustrating the operation of content distribution functions of the present invention. As depicted in FIG. 3A and FIG. 3B, the example is described within the context of a portion of the communication network architecture depicted and described with respect to FIG. 1 and, further, is depicted and described within the context of a network in which only four content items (illustratively, denoted as content items A, B, C, and D) are available to be distributed from content source(s) to content destination nodes using different content distribution modes.

FIG. 3A depicts a communication network architecture $300_A$ for the content distribution scheduling portion of the content distribution functions of the present invention. Specifically, FIG. 3A depicts content distribution scheduling for four content destination nodes (illustratively, including a first EUT $140_1$, a second EUT $140_2$, and a third EUT $140_3$, and a LCN 131). The communication network architecture $300_A$ includes a content prediction node (CPN) 310. The CPN 310 receives content utility feedback information 305 associated with the content destination nodes. The CPN 310 processes the content utility feedback information 305 to determine content utility prediction information 315. The CPN 310 provides the content utility prediction information 315 to a content distribution scheduler (illustratively, CDS 150).

As depicted in FIG. 3, first EUT $140_1$, second EUT $140_2$, and third EUT $140_3$ comprise ones of the EUTs 140 of FIG. 1, LCN 131 is LCN 131 of FIG. 1, and CDS 150 is CDS 150 of FIG. 1. As described herein, CPN 310, which is capable of receiving content utility feedback information 305 and producing content utility prediction information 315, may be any node including predictive intelligence. For example, CPN 310 may include one or more of the nodes of FIG. 1 (e.g., one or more of CDNs 121, one or more of CSs 111, or any other nodes capable of performing predictive intelligence). Although omitted for purposes of clarity, as described herein predictive intelligence may also be provided by some or all of the content destination nodes, either in place of network-based predictive intelligence or in conjunction with network-based predictive intelligence.

As described herein, content utility feedback information may include information identifying content items currently available at content destination nodes, content items that are, will be, and/or may be useful to content destination nodes, and the like, as well as various combinations thereof. In one embodiment, for a given content destination node (or a given network segment include multiple content destination nodes), content utility feedback information for a content item provides an indication of a level of utility of that content item to the content destination node(s).

As depicted in FIG. 3, content utility feedback information 305 for this example indicates the following: first EUT $140_1$ wants A (with probability 0.5), B (with probability 0.3), and D (with probability 0.4), and has B; second EUT $140_2$ wants A (with probability 0.6) and C (with probability 0.1), but does not have any storage capabilities; third EUT $140_3$ wants A (with probability 0.4), B (with probability 0.3), and C (with probability 0.2), and can get B from LCN 131; and LCN 131 wants A (with probability 0.6) and wants C on behalf of second EUT $140_2$ (with probability 0.1). For purposes of simplicity, this example uses static probabilities that do not vary over time, and, further, assumes that all content items are of equal marginal value.

As described herein, content utility prediction information for a given content item may include a utility value indicative of a probability of utility of the content item, a volume (fan-out) value indicative of a number of content destination nodes which may consider the content item to be useful, and the like. In this example, fan-out (F-O) is used to a select distribution mode for each content item and utility (U) is used to determine sequencing of the content items for delivery to content destination nodes.

The content utility prediction information 315 indicates the following: content item A has a utility value of 1.5 and a fan-out of 4 (since all 4 content destination nodes either want or may want content item A); content item B has a utility value of 0 and a fan-out of 0 (since although first EUT $140_1$ may want B it also already has B; and although third EUT $140_3$ may want B it can get B from LCN 131); content item C has a utility value of 0.3 and a fan-out of 2 (since although three of the content destination nodes want content item C, LCN 131 wants content item C on behalf of second EUT $140_2$ because second EUT $140_2$ has no storage); and content item D has a utility value of 0.4 and a fan-out of 1 (since the first EUT $140_1$ is the only one of the four content destination nodes for which there is any indication that content item D may be useful).

As depicted in FIG. 3A, in one embodiment the utility value for each of the content items is computed by summing the individual probability values associated with each of the content destination nodes. For example, content item A has a utility value of 1.5 because first EUT $140_1$ wants A with probability 0.5, second EUT $140_2$ wants A with probability 0.6, third EUT $140_3$ wants A with probability 0.4, and LCN 131 wants A with probability 0.6 (i.e., 0.5+0.6+0.4=2.1; note that the second 0.6 value is not counted because LCN 131 wants content item A on behalf of second EUT $140_2$). The utility value for a content item may be computed in other ways (e.g., computing an average probability value for the content item using the individual probability values of the content utility feedback information, computing a weighted utility value using weighted versions of the probability values of the content utility feedback information, factoring in content utility for future points in time, and the like).

FIG. 3B depicts a communication network architecture 300B for the content distribution portion of the content distribution functions of the present invention. Specifically, FIG. 3B depicts content distribution for four content destination nodes (illustratively, first EUT $140_1$, second EUT $140_2$, third EUT $140_3$, and LCN 131 depicted and described with respect to FIG. 3A). The communication network architecture 300B includes a content distribution scheduler (illustratively, CDS 150 of FIG. 1) directing distribution of content items from a content source (illustratively, CS 110 of FIG. 1) to the content destination nodes. The CDS 150 schedules distribution of content items from the CS 110 to the content destination nodes using received content utility prediction information (illustratively, content utility prediction information 315 depicted and described with respect to FIG. 3A).

As depicted in FIG. 3B, CDS 150 selects the content distribution mode for a content item using various information, such as content utility prediction information 315 associated with the content item (depicted and described with respect to FIG. 3A) and, optionally, other information (e.g., such as network topology, current state of the network, expected state of the network, or any other relevant information), and the like, as well as various combinations thereof. The CDS 150 may prioritize distribution of the content items using various information, such as the content distribution modes selected for the respective content items, as well as other information (e.g., current and/or expected state of the network, and like information), and the like, as well as various combinations thereof.

The CDS 150 outputs a content distribution schedule 320 that specifies a content distribution mode for each content item selected to be distributed to one or more content destination nodes and, optionally, prioritizes distribution of the content items. The content distribution schedule 320 may include other information related to content distribution (omitted from FIG. 3B for purposes of clarity).

As depicted in FIG. 3B, broadcast distribution is selected for content item A (since utility is 1.5 and the fan-out is 4), multicast distribution is selected for content item C (since utility is 0.4 and the fan-out is 2), and unicast distribution is selected for content item D (since utility is 0.3 and the fan-out is 1). The content item B does not need to be distributed because LCN 131 already has a copy of content item B, first EUT $140_1$ already has a copy of content item B, there is no indication that second EUT $140_2$ wants content item B (and even if second EUT $140_2$ does want content item B, it can be sourced from LCN 131 or from EUT $140_1$), and third EUT $140_3$ can get content item B from LCN 131 or from EUT $140_1$. As depicted in content distribution schedule 320, the content items are prioritized as follows (from highest priority to lowest priority): content item A via broadcast, content item D via unicast, and content item C via multicast.

The CDS 150 provides the content distribution schedule 320 to CS 110. The CS 110 distributes content to content distribution nodes according to the content distribution schedule 320. In this example, it will be assumed that the broadcast network is a separate network (e.g., via satellite or some other broadcast network), but that the multicast and unicast distribution modes share a network (e.g., a wireline broadband network or some other network). Further, for simplicity in describing distribution of content items according to content distribution schedule 320, it will be assumed that each of these networks only has enough capacity to send one content item at a time.

As depicted in FIG. 3B, content items A, D, and C are distributed. The content item A is distributed, via broadcast to one of the CDNs 121 of CDN 120, which distributes content item A to LCN 131 and all three EUTs $140_1$-$140_3$. The content item D is distributed (contemporaneously with distribution of content item A via broadcast transmission) in unicast mode on the shared multicast/unicast network. The next content item distributed on the shared multicast/unicast network is content item C, which is distributed via multicast.

The CS 110 transmits one copy of content item C to a multicast replication point (illustratively, one of CDNs 121 of CDN 120), which replicates content item C and delivers the copies of content item C to LCN 131 and third EUT $140_3$. In this last example, content item C could have been retrieved by EUT $140_3$ from LCN 131, but in other instances (e.g., where no LCN exists), multicast will enable the distribution of popular content to many EUTs efficiently.

The present invention enables efficient merging of scheduled content distribution (e.g., in broadcast, switched broadcast, and multicast networks) with non-scheduled content delivery (e.g., unicast networks) using 1:N distribution capabilities and content caching to gain network efficiencies. The present invention enhances efficiency of content delivery within the context of increasingly personalized content. The efficient use of network resources drives services capabilities and controls costs, both of which are important for service providers.

Figure 4:
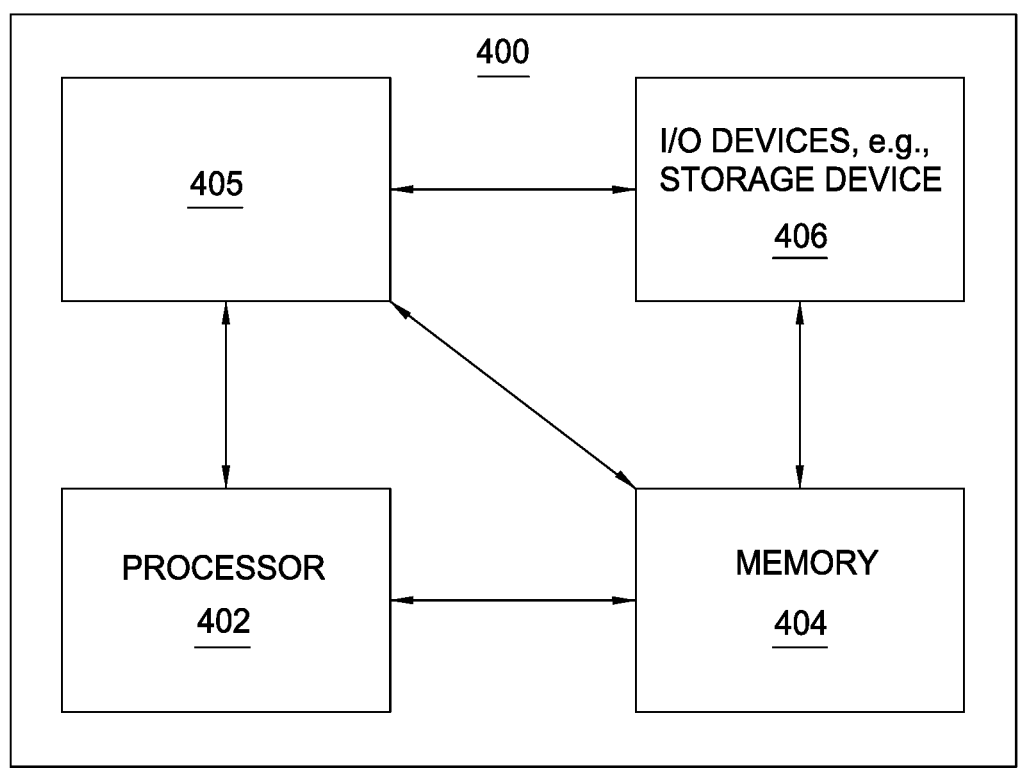
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a content distribution module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present content distribution process 405 can be loaded into memory 404 and executed by processor 402 to implement the functions as discussed above. As such, content distribution process 405 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      receive content utility feedback information associated with a set of available content items, wherein the content utility feedback information comprises at least one of an indication of past content consumed or an indication of signaling regarding content of interest;
      determine, from the set of available content items based on at least a portion of the content utility feedback information, a content item predicted to be of interest to a content destination node;
      receive network status information associated with at least one communication network available to support transport of content to the content destination node;
      determine, based on at least a portion of the network status information, a content distribution mode for delivery of the content item to the content destination node and a content distribution time for delivery of the content item to the content destination node; and
      initiate, based on the content distribution mode and the content distribution time, a process for providing the content item to the content destination node.

2. The apparatus of claim 1, wherein the content item predicted to be of interest to the content destination node is determined based on each of the indication of past content consumed and the indication of signaling regarding content of interest.

3. The apparatus of claim 1, wherein the content item predicted to be of interest to the content destination node is determined based on one or more characteristics of one or more of the available content items.

4. The apparatus of claim 1, wherein the content distribution mode for delivery of the content item to the content destination node is determined based on at least a portion of the content utility feedback information.

5. The apparatus of claim 1, wherein the content distribution mode for delivery of the content item to the content destination node is determined based on one or more characteristics of the content destination node.

6. The apparatus of claim 1, wherein the content item predicted to be of interest to the content destination node is determined based on content utility prediction information, wherein the content utility prediction information is determined based on at least a portion of the content utility feedback information.

7. The apparatus of claim 6, wherein the content utility prediction information is determined based on a probability that the content item predicted to be of interest to the content destination node will be used at the content destination node at a time.

8. The apparatus of claim 7, wherein the content utility prediction information is determined based on at least one of a storage factor representing a probability that the content item predicted to be of interest to the content destination node will not be available at the content destination node at the time or a value of delivering the content item predicted to be of interest to the content destination node to the content destination node at the time.

9. The apparatus of claim 1, wherein the content destination node comprises an end user terminal, a caching node, or a content distribution node, or a network node.

10. A non-transitory computer readable medium storing computer program code configured to cause an apparatus to at least:
   receive content utility feedback information associated with a set of available content items, wherein the content utility feedback information comprises at least one of an indication of past content consumed or an indication of signaling regarding content of interest;
   determine, from the set of available content items based on at least a portion of the content utility feedback information, a content item predicted to be of interest to a content destination node;

receive network status information associated with at least one communication network available to support transport of content to the content destination node;

determine, based on at least a portion of the network status information, a content distribution mode for delivery of the content item to the content destination node and a content distribution time for delivery of the content item to the content destination node; and initiate, based on the content distribution mode and the content distribution time, a process for providing the content item to the content destination node.

11. The non-transitory computer readable medium of claim 10, wherein the content item predicted to be of interest to the content destination node is determined based on each of the indication of past content consumed and the indication of signaling regarding content of interest.

12. The non-transitory computer readable medium of claim 10, wherein the content item predicted to be of interest to the content destination node is determined based on one or more characteristics of one or more of the available content items.

13. The non-transitory computer readable medium of claim 10, wherein the content distribution mode for delivery of the content item to the content destination node is determined based on at least a portion of the content utility feedback information.

14. The non-transitory computer readable medium of claim 10, wherein the content distribution mode for delivery of the content item to the content destination node is determined based on one or more characteristics of the content destination node.

15. The non-transitory computer readable medium of claim 10, wherein the content item predicted to be of interest to the content destination node is determined based on content utility prediction information, wherein the content utility prediction information is determined based on at least a portion of the content utility feedback information.

16. The non-transitory computer readable medium of claim 15, wherein the content utility prediction information is determined based on a probability that the content item predicted to be of interest to the content destination node will be used at the content destination node at a time.

17. The non-transitory computer readable medium of claim 16, wherein the content utility prediction information is determined based on at least one of a storage factor representing a probability that the content item predicted to be of interest to the content destination node will not be available at the content destination node at the time or a value of delivering the content item predicted to be of interest to the content destination node to the content destination node at the time.

18. The non-transitory computer readable medium of claim 10, wherein the content destination node comprises an end user terminal, a caching node, or a content distribution node, or a network node.

19. A method, comprising:

receiving content utility feedback information associated with a set of available content items, wherein the content utility feedback information comprises at least one of an indication of past content consumed or an indication of signaling regarding content of interest;

determining, from the set of available content items based on at least a portion of the content utility feedback information, a content item predicted to be of interest to a content destination node;

receiving network status information associated with at least one communication network available to support transport of content to the content destination node;

determining, based on at least a portion of the network status information, a content distribution mode for delivery of the content item to the content destination node and a content distribution time for delivery of the content item to the content destination node; and initiating, based on the content distribution mode and the content distribution time, a process for providing the content item to the content destination node.

* * * * *